United States Patent Office 3,321,416
Patented May 23, 1967

3,321,416
SELF-EXTINGUISHING PLASTIC
COMPOSITIONS
Rolf Dieter Rauschenbach, Ludwigshafen (Rhine), Ferdinand Meyer, Ziegelhausen, Karl Wintersberger, Ludwigshafen (Rhine), and Guenther Daumiller, Ziegelhausen, Germany, assignors to Badische Anilin- & Soda-Fabrik Aktiengesellschaft, Ludwigshafen (Rhine), Germany
No Drawing. Filed Oct. 21, 1964, Ser. No. 405,565
Claims priority, application Germany, Oct. 17, 1961,
B 64,406
5 Claims. (Cl. 260—2.5)

This is a continuation-in-part of our application Ser. No. 229,477, filed Oct. 9, 1962, now abandoned.

This invention relates to a self-extinguishing or flame-retardant plastic compositions which contain a polymer, an organic chlorine compound and a metal complex compound.

It is known to impart flame retardancy to thermoplastic polymers by incorporation of organic halogen compounds. The mixtures must contain at least 20% by weight of chlorine or 6% by weight of bromine in order to fulfill the requirements expected of self-extinguishing plastic compositions. However, mixtures of polymers with such large amounts of organic halogen compounds have less favorable mechanical properties than the pure polymers. Thus for example organic halogen compounds act as plasticizers so that the self-extinguishing mixtures have lower softening points than the pure polymers.

It is also known that the fireproofing effect of bromine-containing compounds can be increased by additives so that an adequate fireproofing effect can be achieved with considerably smaller amounts of bromine-containing compounds. Thus for example it is possible to improve the fireproofing effect of organic bromine compounds by adding organic peroxides. Organic peroxides have the disadvantage however that they gradually decompose under the action of heat and light and thus lose their effect.

It is also known to use chlorinated hydrocarbons together with antimony trioxide as flame retardants for thermoplastic polymers. It is a disadvantage that relatively large amounts of antimony trioxide are required and therefore the mechanical properties of the polymers are also unfavorably affected by the addition thereof, Moreover this substance cannot be added to the monomers prior to the polymerization but can only be applied to the finished polymer.

It is an object of this invention to provide self-extinguishing plastic compositions containing smaller amounts of organic chlorine compounds than the prior art plastic compositions. Another object of the invention is plastic compositions the mechanical properties of which are not unfavorably affected by the content of flame retardant. A particular object of the invention is self-extinguishing plastic compositions capable of being expanded. A further object of the invention is self-extinguishing foamed moldings. Other objects and advantages of the invention will become apparent from the following detailed description.

The objects of this invention are achieved by a plastic composition which contains:

(a) Polystyrene or poly-α-methylstyrene or copolymers of styrene or copolymers of α-methylstyrene;

(b) A non-volatile organic chlorine compound; and (c) A complex compound of the general formula $Me_xAr_{y-1}(CO)_{z-1}$ in which $x$ denotes one of the whole numbers 1 to 3, $y$ denotes one of the whole numbers from 1 to 3, $z$ denotes one of the whole numbers from 1 to 13 and $(y-1)+(z-1)$ is equal to one of the numbers 2 to 12, Me denotes a transition metal of groups VIB, VIIB and VIII of the Periodic Chart of the Elements as published in Handbook of Chemistry and Physics, 40th ed. (1958–1959), Cleveland, Ohio, and Ar denotes an aromatic system. The said transition metals are chromium, manganese, iron, cobalt, nickel, molybdenum, technetium, ruthenium, rhodium, tungsten, rhenium, osmium, iridium and platinum. The complex compounds of chromium, manganese, iron, cobalt, nickel and molybdenum are particularly suitable.

By an aromatic system we mean substituted or unsubstituted cyclopentadienyl or substituted or unsubstituted benzene. These compounds have the general formulae:

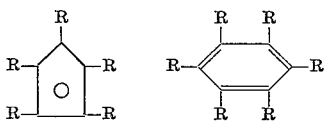

in which R denotes a hydrogen atom, an unsubstituted or substituted alkyl, alkoxy, aryl or acyl group, or a halogen atom.

Examples of suitable compounds are: dicyclopentadienyl cobalt and dicyclopentadienyl nickel (nickelocene), acetyldicyclopentadienyl complexes of these metals, dibenzene chromium, chlorobenzene chromium dicarbonyl, bis-cyclopentadienyl chromium tricarbonyl, cyclopentadienyl-molybdenum tricarbonyl, bis-cyclopentadienyl cobalt dicarbonyl, cyclopentadienyl nickel carbonyl, cyclopentadienyl iron dicarbonyl, manganese carbonyls, such as dimanganese decacarbonyl, molybdenum carbonyls, such as dimolybdenum hexacarbonyl, cobalt carbonyls, such as dicobalt octacarbonyl. Complex compounds of dicyclopentadienyliron (ferrocene) are particularly suitable.

The complex compounds are added to the plastic compositions in amounts of 0.05 to 5% by weight, preferably 0.1 to 1% by weight with reference to the total amount of the plastic composition.

Suitable non-volatile organic chlorine compounds to be used for fireproofing with the said complex compounds are those containing at least 4 carbon atoms and between 40 and 75% by weight of chlorine, the chlorine atoms being attached to aliphatic or cycloaliphatic carbon chains. High molecular weight chlorine-containing compounds which have no effect or only a trival effect on the properties of the thermoplasts are particularly suitable. Examples of such compounds are chlorinated polyvinyl chloride having a chlorine content of about 62% by weight, chlorinated polyisobutylene having a chlorine content of about 60 to 65% by weight, and chlorinated polystyrene having a chlorine content of about 40 to 50% by weight. Chlorinated paraffins having a chlorine content of 60 to 75% by weight, whose carbon chains contain at least eighteen to forty carbon atoms are especially suitable. Low molecular weight chlorine compounds, such as hexachlorocyclododecane, hexachlorocyclopentadiene, hexachloroendomethylene tetrahydrophthalic acid, tetrachlorobutyrolactone, and tetrachlorobutanediol diacetate, are also effective in the same way in association with the said complex compounds. In any case it is advisable to use chlorine compounds having a high chlorine content so that the amount of the compounds added to the plastic composition may be kept as low as possible. The chlorine compounds are added to the thermoplastics in such amounts that the plastic compositions have a chlorine content of 2 to 7% by weight, preferably 3 to 6% by weight.

The plastic compositions contain polystyrene or poly-

α-methylstyrene or copolymers of styrene and other monomeric olefinically unsaturated compounds that are copolymerizable with styrene, containing at least 60% by weight of polymerized styrene units or copolymers of α-methylstyrene and other monomeric olefinically unsaturated compounds that are copolymerizable with α-methylstyrene, containing at least 60% by weight of polymerized α-methylstyrene units. Suitable compounds that are copolymerizable with styrene are the same that are copolymerizable with α-methylstyrene. Examples of copolymerization components are: acrylonitrile, butadiene, esters of α,β-unsaturated carboxylic acids, acrylic or methacrylic acid with alcohols having one to eight carbon atoms and N-vinylcarbazole. Divinylbenzene may also be used in small quantities (0.5 to 0.01% by weight).

Expandable plastic compositions of polystyrene or styrene copolymers, an organic chlorine compound and a complex compound contain as expanding agent hydrocarbons or halohydrocarbons which are gaseous or liquid under standard conditions, which do not dissolve the styrene polymer and of which the boiling point is lower than the softening point of the polymer. Examples of suitable expanding agents are: propane, butane, pentane, hexane, cyclohexane, dichlorodifluoromethane and trifluorochloromethane.

The expanding agent is contained in the plastic composition in an amount of 2 to 20% by weight with reference to the polymer contained in the plastic composition. Self-extinguishing foamed moldings can be obtained from such expandable plastic compositions. Thus for example fine particles of the said compositions may be heated in gas-permeable molds to temperatures above the softening point of the polymer contained in the composition so that the particles expand and cohere to form molded articles. Expandable plastic compositions of the said kind may also be worked up into expanded plastic sheets by means of extruders.

The complex compounds and the organic halogen compounds may be mixed simultaneously or consecutively with the thermoplastics. For example they may be introduced together or singly into the plastic on rollers, in an extruder or in a kneader. In many cases they may be added to the monomers prior to the polymerization. It is also possible, for example in the production of cast films, to add the complex compounds together with the halogen compounds to a solution of the plastic so that they remain in the plastic after removal of the solvent.

In the particular case of expandable granular compositions containing an expanding agent, it is most advantageous to add the complex compound, halogen compound and expanding agent to the monomer prior to the bead polymerization. It is however also possible in the same way to dissolve the thermoplastic, for example polystyrene, the complex compound, the halogen compound and the expanding agent in a low boiling point solvent immiscible with water, to pour the solution into water in which an organic protective colloid has been dissolved, and to prepare expandable particles having flame-retardant properties by blowing off the solvent while stirring. Another variant of the process is dusting complex compound and/or halogen compound onto the polymer particles containing expanding agent.

The molding compositions according to this invention are suitable for example for injection molding or extrusion to self-extinguishing shaped articles or profiles. Dissolved in organic solvents, they may also be used as self-extinguishing surface coating materials for example for wood or metal. Molding compositions according to this invention having a content of expanding agent have particular importance for the production of self-extinguishing foamed materials.

As a result of their low content of organic chlorine compounds, the molding compositions according to this invention have softening points which differ only trivially from those of the polymers contained therein.

The flame retardancy of the molding compositions is tested in the following way. To test unexpanded material a shaped article having the dimensions 0.1 x 3 x 12 cm., and to test expanded material a shaped article of the dimensions 3 x 3 x 12 cm. is hold for five seconds in the non-luminous flame of a Bunsen burner and then removed from the flame with a steady movement. The period which elapses between removal of the shaped article from the Bunsen flame and the extinction of the flame of the burning plastic is a measure of the flame retardancy of the plastic. An extinction period of 0 to 2 seconds may be regarded as very good, and a period of 2 to 5 seconds may be regarded as good. Extinction periods of less than 10 seconds are adequate. Molding compositions which have an insufficient flame retardant finish, or no such finish, burn up completely after removal from the flame.

The invention is illustrated by, but not limited to, the following examples. The parts and percentages are by weight. The K-values were determined by the method of Fikentscher, Cellulosechemie, 13, 60 (1932).

EXAMPLE 1

A mixture of 1860 parts of styrene, 140 parts of a chlorinated paraffin containing 70% of chlorine, 200 parts of pentane, 6 parts of ferrocene and 9.3 parts of azodiisobutyronitrile is suspended in 4000 parts of water in which 4 parts of polyvinylpyrrolidone having the K-value 70 has been dissolved, in an agitated autoclave and the suspension is kept at temperatures between 70° and 90° C. for forty hours while stirring.

The polymer particles obtained, which contain pentane, ferrocene and chloroparaffin, have a K-value of 55 according to Fikentscher; their softening point according to Fikentscher is 95° C.; they contain 4.9% of chlorine.

Expanded shaped articles having a bulk density of 15 g./l. prepared therefrom cease to burn after less than 2 seconds when tested by the test method outlined above.

Foamed moldings of the same material which contain neither ferrocene nor chlorinated paraffin burn up completely under the same test conditions.

A self-extinguishing plastic composition can be obtained in the same way by using cinnamoylferrocene instead of ferrocene.

EXAMPLE 2

A mixture of 1456 parts of styrene, 364 parts of acrylonitrile, 180 parts of a chlorinated polyisobutylene containing 65% of chlorine, 7.3 parts of dinitrosopentamethylenetetramine and 4 parts of ferrocene is suspended in a solution of 6 parts of polyvinyl alcohol in 4000 parts of water in an agitated autoclave and the suspension is kept at temperatures of 80° C. to 95° C. for forty hours while stirring. 80 parts of pentane and 4 parts of acetone are added to half of the suspension and this is stirred for another ten hours in the autoclave at 85° C.

The polymer particles are isolated from the suspension and a shaped article is prepared therefrom by press-molding. Another molding is prepared from the polymer particles.

Both the unexpanded and expanded samples cease to burn in less than two seconds.

Shaped articles which contain merely ferrocene or chlorinated polyisobutylene burn under the said test conditions.

EXAMPLE 3

900 parts of polystyrene, 100 parts of a chlorinated polystyrene having 45% of chlorine, 2.5 parts of ferrocene and 150 parts of pentane are dissolved in 2000 parts of methylene chloride and the solution is stirred with a mixture of 4000 parts of water and 20 parts of a copolymer derived from 95 parts of vinylpyrrolidone and 5 parts of methylacrylate. The solvent is then removed by passing air through the mixture. The particles of polystyrene which remain contain chloropolystyrene, pentane and ferrocene and may be processed into an expanded plastic which ceases to burn in less than five seconds in the burning test.

In the same way, expandable compositions may be manufactured by using a copolymer of 91 parts of styrene and 9 parts of 2-ethylhexyl acrylate instead of polystyrene.

EXAMPLE 4

940 parts of bead polystyrene containing 5% of pentane is intimately mixed with 60 parts of chlorinated polyvinyl chloride containing 62% of chlorine, 4 parts of ferrocene and 10 parts of a liquid highly viscous polyether and processed into an expanded article. The extinction period of the article by the above test is less than ten seconds.

In the same way, self-extinguishing moldings may be obtained by using acetylferrocene, diphenylferrocene or methoxyferrocene instead of ferrocene.

EXAMPLE 5

92 parts of a high-impact styrene polymer obtained by polymerizing styrene in the presence of 10% by weight, based on styrene, of a styrene-butadiene copolymer 8 parts of tetrachlorobutyrolactone and 0.3 part of ferrocene are dissolved in 250 parts of methylene chloride. A cast film is prepared from the solution. When the film is tested under the above-mentioned conditions, it ceases to burn in less than five seconds.

EXAMPLE 6

91 parts of a styrene-acrylonitrile copolymer prepared from 80 parts of styrene and 20 parts of acrylonitrile, 9 parts of hexachlorocyclododecane, 12 parts of pentane and 0.2 part of ferrocene are dissolved in 250 parts of methylene chloride. An expandable cast film is prepared from the solution, and this may be expanded in boiling water to give an expanded article having the bulk density 40 g./l. The film ceases to burn after less than ten seconds.

In the same way, a self-extinguishing composition may be obtained from a copolymer of 87 parts of styrene, 10 parts of acrylonitrile and 3 parts of methyl methacrylate.

EXAMPLE 7

94 parts of poly-α-methylstyrene is mixed on rollers with 6 parts of tetrachlorobutanediol diacetate and 0.4 part of nickelocene, and the mixture press-molded to a sheet 1 mm. in thickness. The sample ceases to burn in less than five seconds. A copolymer of 62 parts of α-methylstyrene and 28 parts of acrylonitrile may be used instead of poly-α-methylstyrene.

EXAMPLE 8

93 parts of polystyrene, 7 parts of chloroparrafin (containing 70% of chlorine) and 0.35 part of nickelocene are mixed in an extruder and processed into a sheet 1 mm. in thickness by means of a sheeting die. The sheet ceases to burn in less than ten seconds. A copolymer of 90 parts of styrene and 10 parts of N-vinylcarbazole may be used instead of polystyrene.

EXAMPLE 9

1860 parts of styrene is polymerized in the way described in Example 1 in the presence of 140 parts of chloroparaffin (containing 70% of chlorine) and 200 parts of pentane by means of 10 parts of benzoyl peroxide. The isolated and dried polymer particles are then intimately mixed with 10 parts of ferrocene.

Expanded moldings prepared from this mixture have an extinction period of less than ten seconds.

EXAMPLE 10

1860 parts of styrene is polymerized by means of 10 parts of azodiisobutyronitrile in the presence of 6 parts of ferrocene and 200 parts of pentane in the way described in Example 1. The dried polymer particles obtained are then intimately mixed with 140 parts of chloroparaffin (containing 70% of chlorine).

A foamed molding prepared from this mixture ceases to burn after less than five seconds.

EXAMPLE 11

92 parts of polystyrene, 8 parts of chloroparaffin (containing 70% of chlorine) and 0.4 part of dibenzene chromium are mixed in under nitrogen with 8 parts of hexane in an extruder provided with a liquid inlet pipe and the resultant mixture is processed by means of a sheeting die kept at a temperature of 120° C. into an expanded plastic sheet.

The sheet obtained ceases to burn within ten seconds of being removed from the extraneous flame.

Chlorobenzene chromium tricarbonyl may be used in the same way instead of dibenzene chromium.

EXAMPLE 12

In a number of experiments, 1860 parts of styrene, 140 parts of chloroparaffin (containing 70% of chlorine), 200 parts of pentane, 6 parts of one of the complex compounds given below and 9.3 parts of azodiisobutyronitrile are suspended in an agitated autoclave in 4000 parts of water in which 4 parts of polyvinyl-pyrrolidone having the K-value 70 has been dissolved. The suspension in each case is kept at between 70° and 90° C. for forty hours while stirring.

The bead polymers obtained are expanded in gas-permeable molds into moldings having the density 15 g./l.

The moldings are tested by the method outlined above.

The complex compounds used are given in the following table, the extinction period being less than ten seconds in all cases:

Table

Complex compounds used:

Bis-cyclopentadienyl chromium tricarbonyl,
$[C_5H_5—Cr—(CO)_3]_2$
Cyclopentadienyl molybdenum tricarbonyl,
$C_5H_5—Mo—(CO)_3$
Bis-cyclopentadienyl cobalt dicarbonyl,
$[C_5H_5—Co—(CO)_2]_2$
Cyclopentadienyl nickel carbonyl, $C_5H_5—Ni—CO$
Cyclopentadienyl iron dicarbonyl, $C_5H_5—Fe—(CO)_2$

EXAMPLE 13

95 parts of polystyrene, 5 parts of chloroparaffin (containing 70% of chlorine) and 0.3 part manganese carbonyl $[Mn_2(CO)_{10}]$ are dissolved in 250 parts of dichloroethylene. The solution is made into cast films which cease to burn after less than 10 seconds. In the same way, molybdenum hexacarbonyl $[Mo(CO)_6]$ or dicobalt octacarbonyl $[Co_2(CO)_8]$ may be used instead of manganese carbonyl.

EXAMPLE 14

Three solutions comprising polystyrene, chloroparaffin and pentane dissolved in methylene chloride, one of the solutions containing in addition ferrocene and another containing in addition antimony trioxide, are made into cast films. The solvent is evaporated so that expandable films are obtained. The films contain (a)
90 parts of polystyrene
8 parts of chloroparaffin (70% by weight of chlorine)
0.3 part of ferrocene
0.5 part of pentane (b)
90 parts of polystyrene
8 parts of chloroparaffin (70% by weight of chlorine)
2 parts of antimony trioxide
5 parts of pentane (c)
90 parts of polystyrene
8 parts of chloroparaffin (70% by weight of chlorine)
5 parts of pentane.

The films are expanded in boiling water and stored at room temperature for eight days. Then their flame retardancy is determined, in the way indicated above. Film (a) ceases to burn in one second, whereas film (b) and film (c) continue to burn. The results show that only the composition according to the present application may be regarded as self-extinguishing.

We claim:
1. A self-extinguishing plastic composition containing:
    (a) a polymer containing at least 60% by weight of polymerized units selected from the group consisting of styrene, α-methylstyrene, and mixtures thereof;
    (b) an organic chlorine compound containing at least 4 carbon atoms and between 40 and 75% by weight of chlorine, the chlorine atoms being attached to carbon chains selected from the group consisting of aliphatic and cycloaliphatic carbon chains in an amount sufficient to provide a chlorine content of between 2 and 7% by weight of the plastic composition;
    (c) 0.05 to 5% by weight of the plastic composition of a complex of the general formula

$$Me_xAr_{y-1}(CO)_{z-1}$$

in which $x$ is one of the whole numbers from 1 to 3, $y$ is one of the whole numbers from 1 to 3, $z$ is one of the whole numbers from 1 to 13 and $$(y-1)+(z-1)$$

is one of the whole numbers from 2 to 12, Me denotes a transition metal of groups VIB, VIIB and VIII of the Periodic Chart and Ar denotes an aromatic system being a member selected from the group consisting of substituted and unsubstituted cyclopentadienyl and substituted and unsubstituted benzene, said substituents being selected from the group consisting of alkyl, alkoxy, aryl, acyl, and halogen.

2. A self-extinguishing plastic composition as claimed in claim 1 wherein the complex is ferrocene.

3. A self-extinguishing expandable plastic composition containing:
    (a) a polymer containing at least 60% by weight of polymerized units selected from the group consisting of styrene, α-methylstyrene, and mixtures thereof;
    (b) an organic chlorine compound containing at least 4 carbon atoms and between 40 and 75% by weight of chlorine, the chlorine atoms being attached to carbon chains selected from the group consisting of aliphatic and cycloaliphatic carbon chains in an amount sufficient to provide a chlorine content of between 2 and 7% by weight of the plastic composition;
    (c) 0.05 to 5% by weight of the plastic composition of a complex of the general formula $$Me_xAr_{y-1}(CO)_{z-1}$$

in which $x$ is one of the whole numbers from 1 to 3, $y$ is one of the whole numbers from 1 to 3, $z$ is one of the whole numbers from 1 to 13 and $$(y-1)+(z-1)$$

is one of the whole numbers from 2 to 12, Me denotes a transition metal of groups VIB, VIIB and VIII of the Periodic Chart and Ar denotes an aromatic system being a member selected from the group consisting of substituted and unsubstituted cyclopentadienyl and substituted and unsubstituted benzene, said substituents being selected from the group consisting of alkyl, alkoxy, aryl, acyl, and halogen; and
    (d) 2 to 20% by weight with reference to the polymer of an expanding agent which is a readily volatile liquid which does not dissolve the polymer and which has a boiling point below the softening point of the polymer.

4. A self-extinguishing foamed molding containing:
    (a) a polymer containing at least 60% by weight of polymerized units selected from the group consisting of styrene, α-methylstyrene, and mixtures thereof;
    (b) an organic chlorine compound containing at least 4 carbon atoms and between 50 and 75% by weight of chlorine, the chlorine atoms being attached to carbon chains selected from the group consisting of aliphatic and cycloaliphatic carbon chains in an amount sufficient to provide a chlorine content of between 2 and 7% by weight of the plastic composition; and
    (c) 0.05 to 5% by weight of the plastic composition of a complex of the general formula $$Me_xAr_{y-1}(CO)_{z-1}$$

in which $x$ is one of the whole numbers from 1 to 3, $y$ is one of the whole numbers from 1 to 3, $z$ is one of the whole numbers from 1 to 13 and $$(y-1)+(z-1)$$

is one of the whole numbers from 2 to 12, Me denotes a transition metal of groups VIB, VIIB and VIII of the Periodic Chart and Ar denotes an aromatic system being a member selected from the group consisting of substituted and unsubstituted cyclopentadienyl and substituted and unsubstituted benzene, said substituents being selected from the group consisting of alkyl, alkoxy, aryl, acyl, and halogen.

5. A self-extinguishing plastic composition as in claim 1 wherein said substituents are selected from the group consisting of acetyl, diphenyl, methoxy and chlorine.

References Cited by the Examiner

UNITED STATES PATENTS

| | | | |
|---|---|---|---|
| 2,676,927 | 4/1954 | McCurdy et al. | 260—2.5 |
| 2,979,482 | 4/1961 | Piccoli | 260—2.5 |
| 2,986,535 | 5/1961 | Jacobson | 260—2.5 |
| 3,124,557 | 3/1964 | Eichhorn | 260—2.5 |

FOREIGN PATENTS

| | | |
|---|---|---|
| 768,899 | 2/1957 | Great Britain. |
| 839,862 | 6/1960 | Great Britain. |

MURRAY TILLMAN, *Primary Examiner.*

M. FOELAK, *Assistant Examiner.*